Figure 1:
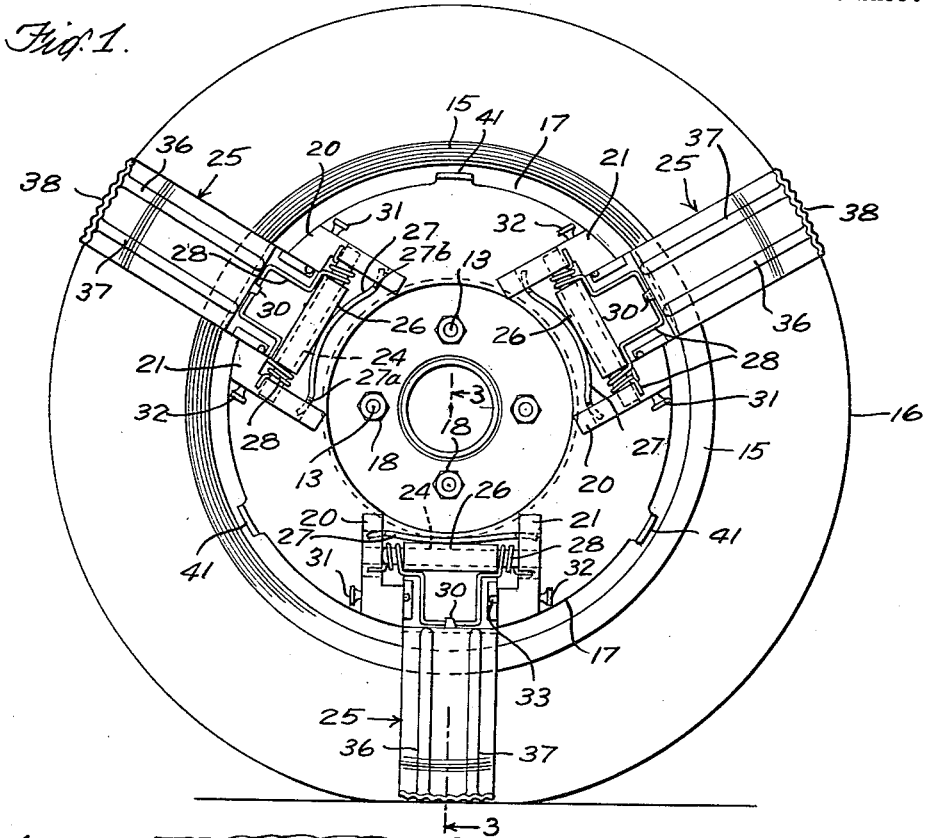

Aug. 14, 1962  D. J. RYAN  3,049,163
TRACTION DEVICE

Filed May 31, 1961  2 Sheets-Sheet 1

INVENTOR
DENNIS J. RYAN
BY
ATTORNEYS

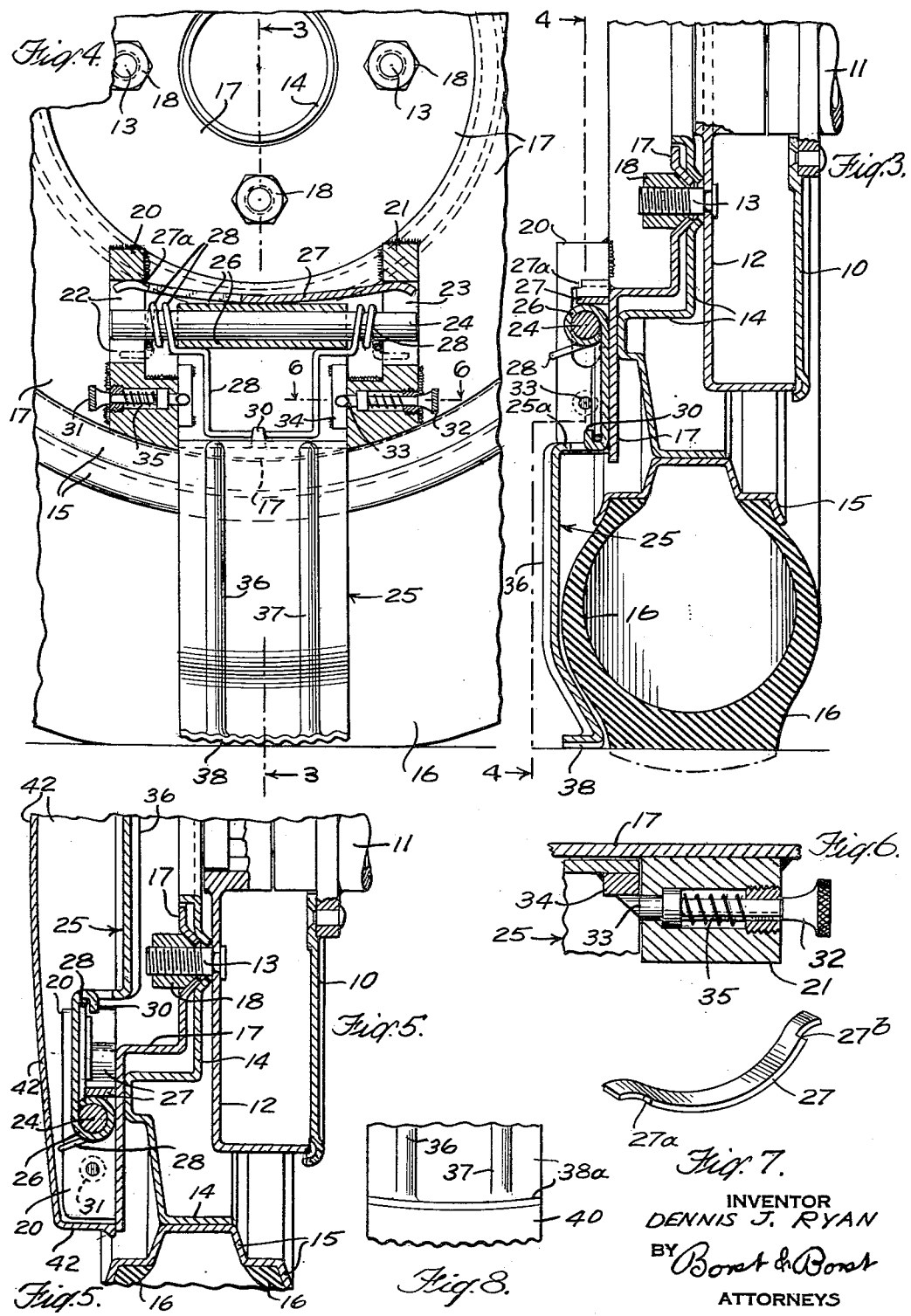

United States Patent Office 3,049,163
Patented Aug. 14, 1962

3,049,163
TRACTION DEVICE
Dennis J. Ryan, 157—11 Sanford Ave., Flushing, N.Y.
Filed May 31, 1961, Ser. No. 113,722
2 Claims. (Cl. 152—216)

This invention relates to friction imparting mechanism and particularly to traction devices arranged for permanent attachment to vehicle wheels the gripping elements of which are mechanically adjustable relative to the wheels on which they are disposed so as to render them optionally operative.

It is common knowledge that conventional chains designed to be stretched over the ground contacting surface of automobile tires have not been entirely practical. Since under normal road surface conditions such vehicles do not have need for traction aiding devices of this type, they are most usually removed from the car wheels and kept in separate readiness for wheel attachment when conditions so require. Ideally, the devices should be always available for attachment wherever the vehicle travels but this is not always feasible. It is a desideratum, therefore, that the device be part of the vehicle's permanent, albeit accessory, equipment. Subsequent devices designed for permanent wheel attachment and intended thereby to supplant chains have not been practical for a different reason. This is due to the cumbersomeness and relative complexity of their components, especially those which are required to move their surface gripping elements into and away from operative position, thus rendering it difficult to effect their concealment during ordinary use of the vehicle.

On automobile wheels, hub caps are employed to conceal the attaching elements which are used to secure the wheel to a part of the frame such as the brake drum. It is in accordance with the concept of this invention that the hub caps also serve to conceal the traction devices when the latter are not in use. To this end the invention contemplates traction devices which are permanently attached to the vehicle wheels and available for use, the traction or gripping ends thereof being mounted on a folding member which is pivotally biased to its inoperative position where their concealment can be effected. Special provision is made to cause the foldable traction device to be also radially biased so that when the device is operatively positioned it will be permitted radial displacement as the tire flattens on contact with the road surface and to minimize the risk of breakage either at the point of their attachment to the wheel or within their internal structure whether the vehicle is passing over hard pavement or relatively soft ice, snow or mud.

It is an object of the invention to provide a traction device of relative simple and economical mechanical structure.

Another object of the invention is to provide a traction device designed for permanent attachment to car wheels being however operatively adjustable so as to permit their ready concealment.

A more complete understanding of the traction device as contemplated by the invention will be obtained on reading the following specification which is taken in conjunction with the accompanying drawings.

Figure 2:
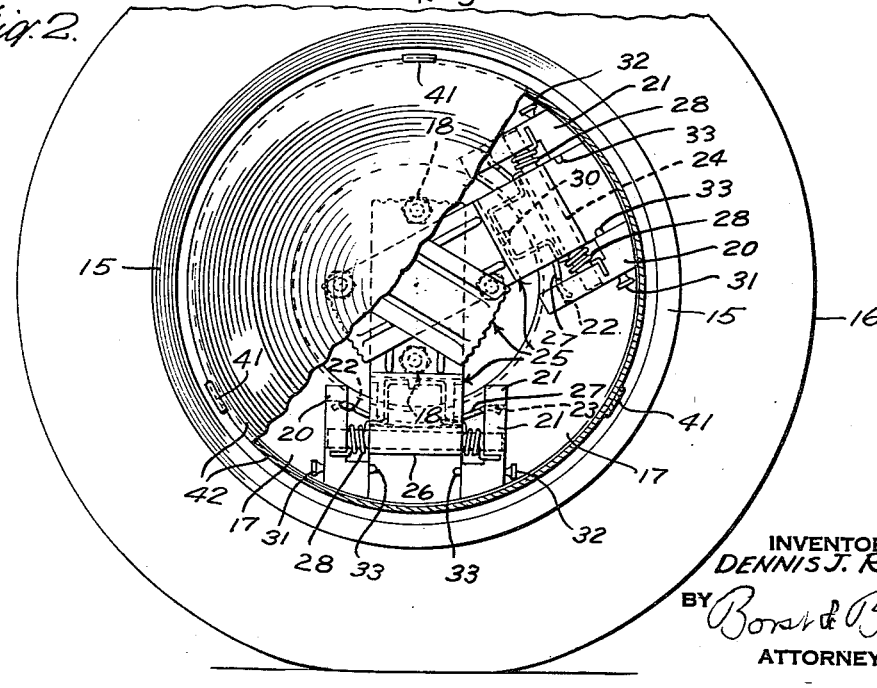

FIG. 1 is a side elevation of a vehicle wheel showing the traction arms in operative position, FIG. 2 is a view similar to FIG. 1 with hub cap partially broken away showing the traction arms in inoperative position and enclosed by the hub cap, FIG. 3 is a partial section on an enlarged scale taken on line 3—3 of FIG. 1 and of FIG. 4, FIG. 4 is a section taken on line 4—4 of FIG. 3, FIG. 5 is a section similar to FIG. 3 showing the traction arms in inoperative position, FIG. 6 is a detail in an enlarged section taken on line 6—6 of FIG. 4, FIG. 7 is a perspective view on reduced scale of the leaf spring employed to bias radially one of the traction arms, and FIG. 8 is a modification showing the operative end of a traction arm.

There is shown in FIG. 3 a detail of a conventional vehicle wheel employed by automobiles, for example, for driving purposes. Accordingly, there is seen a brake housing having a fixed brake plate 10 attached to the housing 11 for the drive shaft and a rotatable brake drum 12 which together with the brake plate house the operative components of the automobile brake. Extending through the brake drum are the usual studs 13 to which the driving wheel including in particular its outer disc plate 14 having an annular rim 15 for the tire 16 is secured.

Also mounted on the studs 13 is base plate 17 being removably secured with the outer disc plate of the wheel to the brake drum by means of the studs 13 and the usual nuts 18.

There is mounted on the base plate 17 as by welding or riveting, a pair of opposing, L-shape blocks 20 and 21. The blocks 20 and 21 have provided opposing slots 22 and 23, respectively, which receive the ends of pin 24 which pivotally support traction arm 25 extending through the apertured or coiled portion 26 of the inner end of the arm. A leaf spring 27, the ends of which are also received in the slots 22 and 23 bearing on the upper ends thereof and against the inner end of the traction arm at its intermediate portion, serves to bias outwardly the traction arm so that the ends of the pin 24 bear against the bottom of the slots when the arm is in normal position as shown in FIG. 2 and FIG. 5 but is allowed to retract therefrom when the arm is in driving contact with the road as shown in FIG. 3 and FIG. 4. The leaf spring has block engaging shoulder portions 27a and 27b, as shown in FIG. 7 in advance of their terminal portions to prevent transverse movement of the spring.

A coil spring 28 is wound about the pin 24 on two sides of the traction arm so as to place the U-shaped section of the coil spring between its coiled ends under tension. This section of the coil spring is held by means of a projection element 30 struck up from a central portion of the traction arm 25 where the arm is caused to flare outwardly at 25a so that it may be further extended in a vertical plane beyond the outer circumference of the tire 16. Accordingly, there is imparted to the traction arm a secondary bias which urges the arm to fold or pivot outwardly away from the tire and, in fact, toward its inoperative position over the wheel axis as shown in FIGS. 2–5.

In order to hold the traction arm tightly against the wheel tire, there are provided a pair of inwardly, spring biased catches 31 and 32, one of said catches being carried in apertures formed in each block through its L section. A detail of the catch 32 is shown in FIG. 6. As shown, the traction arm 25 is held in operative position by virtue of the fact that the inner end 33 of the catch 32 which projects through the aperture in the block 21 under the urging of compression spring 35 engages element 34 which is secured to the arm 25. The purpose of the element 34 is to provide a space consuming element between the arm 25 and the catch 32 to enable the latter to be removed sufficiently from the base plate 17 in order to facilitate its manual operation. When the catch 31 and the catch 32 are both pulled outwardly against their compression springs the traction arm 25 is permitted to pivot away from the tire under the urging of the coil spring 28 to its folded or inoperative position over the wheel axis. The inner end of each catch is cammed so that on returning the traction arm 25 to its operative position the inner surface of the arm will strike the cammed ends of the catches causing the latter to retract from their normal positions in opposition to the compression spring 35 so as to permit the traction arm to pass to its operative position between the base plate 17 and the retaining catches. The catches thus serve to retain the arm in this position while permitting its radial displacement under road pressure in opposition to the spring 27.

A pair of strengthening ribs 36 and 37 arranged in parallel on the outer surface of the traction arm 25 extend from its outwardly flared section to its operative terminus. The ribbed end section of the traction arm is inwardly bent to conform substantially to the tire surface, the end thereof having a projection 38 extending outwardly from the tire. For the purpose of improving traction, the operative surface of the projection 38 is fluted.

In FIG. 8 there is shown a modified projection element 38a disposed at the end of a traction arm which is partially shown in elevation. Secured to the outer end of the projection arm 38a is a rubber traction member 40 the bottom surface of which is provided with a tread for improved traction.

As shown in FIG. 5, the traction arm 25 is folded into its inoperative position with its free end directed radially away from that portion of the tire which it overlays when in operative position. The base plate 17 has provided a plurality of yieldable, retaining elements 41 on its periphery into which hub cap 42 is snapped and held when the traction arms are in folded position. As shown in FIG. 2, there are three traction arms 25 disposed 120° from each other about the wheel. Preferably, the pins for the traction arms are set at slightly different heights in their blocks so that the arms may be nested together in parallel planes. The three arms shown in FIG. 1 are in operative position with the lowermost arm compressed by the road surface slightly retracted against its leaf spring, as shown in detail in FIGS. 3 and 4, while the other two arms are caused to be in fully extended position by their respective leaf springs which is the position they assume also when in inoperative position as shown in FIG. 5.

Various modifications of the invention as described above may be effected by persons skilled in the art without departing from the scope and principle of the invention as defined in the appended claims.

What is claimed is:

1. A traction device mounted on a vehicle wheel provided with a tire in its rim, said traction device comprising a plate member permanently attached to said wheel, a plurality of traction arms pivotally mounted on said plate member, each of said traction arms being sufficient in length to extend beyond the axis of the wheel when selectively disposed in inoperative position so that the traction arms are nested in this position and a traction member secured to the free end of each of said traction arms and extending outwardly from the tire when the arm is selectively disposed in operative position, each of said traction arms being radially displaceable and biased from the axis of said wheel.

2. A traction device mounted on a vehicle wheel provided with a tire in its rim, said traction device comprising a plate member permanently attached to said wheel, a plurality of traction arms pivotally mounted on said plate member, each of said traction arms being sufficient in length to extend beyond the axis of the wheel when selectively disposed in inoperative position so that the traction arms are nested in this position and a traction member secured to the free end of each of said traction arms and extending outwardly from the tire when the arm is selectively disposed in operative position, each of said traction arms being radially displaceable and having physically separate and functionally independent means for spring biasing it from the axis of said wheel.

References Cited in the file of this patent

UNITED STATES PATENTS

| | | |
|---|---|---|
| 1,132,730 | Peak | Mar. 23, 1915 |
| 2,229,251 | Meili | Jan. 21, 1941 |
| 2,330,839 | O'Brien | Oct. 5, 1943 |

FOREIGN PATENTS

| | | |
|---|---|---|
| 533,656 | Belgium | Dec. 15, 1954 |